US012217723B2

United States Patent
Yasuda et al.

(10) Patent No.: US 12,217,723 B2
(45) Date of Patent: Feb. 4, 2025

(54) IMAGE DISPLAY SYSTEM FOR DISPLAYING IMAGES IN DISPLAY AREAS, METHOD FOR CAUSING COMPUTER TO FUNCTION AS IMAGE DISPLAY SYSTEM FOR DISPLAYING IMAGES IN DISPLAY AREAS, AND NON-TRANSITORY COMPUTER READABLE MEDIUM THAT STORES PROGRAM FOR CAUSING COMPUTER TO FUNCTION AS IMAGE DISPLAY SYSTEM FOR DISPLAYING IMAGES IN DISPLAY AREAS

(71) Applicant: EIZO Corporation, Hakusan (JP)

(72) Inventors: Tetsuya Yasuda, Hakusan (JP); Airi Kurokawa, Hakusan (JP); Masahiro Sugumi, Hakusan (JP)

(73) Assignee: EIZO Corporation, Hakusan (JP)

( * ) Notice: Subject to any disclaimer, the term of this patent is extended or adjusted under 35 U.S.C. 154(b) by 0 days.

(21) Appl. No.: 18/264,130

(22) PCT Filed: Feb. 9, 2022

(86) PCT No.: PCT/JP2022/005109
§ 371 (c)(1),
(2) Date: Aug. 3, 2023

(87) PCT Pub. No.: WO2022/185868
PCT Pub. Date: Sep. 9, 2022

(65) Prior Publication Data
US 2024/0312434 A1    Sep. 19, 2024

(30) Foreign Application Priority Data
Mar. 3, 2021    (JP) .................................. 2021-033946

(51) Int. Cl.
*G06F 3/14* (2006.01)
*G09G 5/10* (2006.01)

(52) U.S. Cl.
CPC ............. *G09G 5/10* (2013.01); *G06F 3/1423* (2013.01); *G09G 2320/0626* (2013.01);
(Continued)

(58) Field of Classification Search
CPC ............. G09G 5/10; G09G 2320/0626; G09G 2320/0686; G09G 2360/144; G09G 2360/145; G06F 3/1423
See application file for complete search history.

(56) References Cited

U.S. PATENT DOCUMENTS

2007/0285569 A1    12/2007    Nakamura et al.
2012/0326946 A1    12/2012    Yuan
(Continued)

FOREIGN PATENT DOCUMENTS

CN    103366694 A    10/2013
JP    H05-153531 A    6/1993
(Continued)

OTHER PUBLICATIONS

International Search Report issued on May 10, 2022, in corresponding International Application No. PCT/JP2022/005109, 6 pages.
(Continued)

*Primary Examiner* — Lisa S Landis
(74) *Attorney, Agent, or Firm* — Maier & Maier, PLLC

(57) ABSTRACT

The invention of the present application realizes image display that when multiple display screens are being used, properly controls the luminance of one display screen on the basis of the luminance of another display screen.
An image display system for displaying images in display areas is provided. The image display system includes a first display area, a second display area, and a luminance deter-
(Continued)

mination unit. The luminance determination unit is configured to determine luminance of the second display area on the basis of luminance of the first display area and positional relationships between the first display area, the second display area, and a user and to display the second display area at the determined luminance.

10 Claims, 6 Drawing Sheets

(52) U.S. Cl.
CPC ............. *G09G 2320/0686* (2013.01); *G09G 2360/144* (2013.01); *G09G 2360/145* (2013.01)

(56) References Cited

U.S. PATENT DOCUMENTS

| | | |
|---|---|---|
| 2015/0049003 A1 | 2/2015 | Fujimaki et al. |
| 2015/0106844 A1 | 4/2015 | Funatsu et al. |
| 2017/0229099 A1 | 8/2017 | Mito |
| 2021/0043163 A1 | 2/2021 | Tokuda |
| 2021/0398465 A1* | 12/2021 | Kim .................. G06F 3/0483 |
| 2022/0262284 A1* | 8/2022 | Takao .................. G09F 9/40 |

FOREIGN PATENT DOCUMENTS

| | | |
|---|---|---|
| JP | 2007-279405 A | 10/2007 |
| JP | 2015-080075 A | 4/2015 |
| JP | 2017-156383 A | 9/2017 |
| JP | 2017-156593 A | 9/2017 |
| JP | 2018-072418 A | 5/2018 |
| JP | 2021-028689 A | 2/2021 |
| WO | 2020246296 A1 | 12/2020 |

OTHER PUBLICATIONS

Extended Search Report issued on Jun. 11, 2024, in corresponding European Application No. 22762925.0, 9 pages.

* cited by examiner

FIG.2 (FIRST EMBODIMENT)

FIG.4

| UGR value | Level of discomfort glare |
|---|---|
| 31 | Too terrible |
| 28 | Start to feel too terrible |
| 25 | Uncomfortable |
| 22 | Start to feel uncomfortable |
| 19 | Worried |
| 16 | Start to be worried |
| 13 | Feeling |
| 10 | Start to feel |

FIG.6 (SECOND EMBODIMENT)
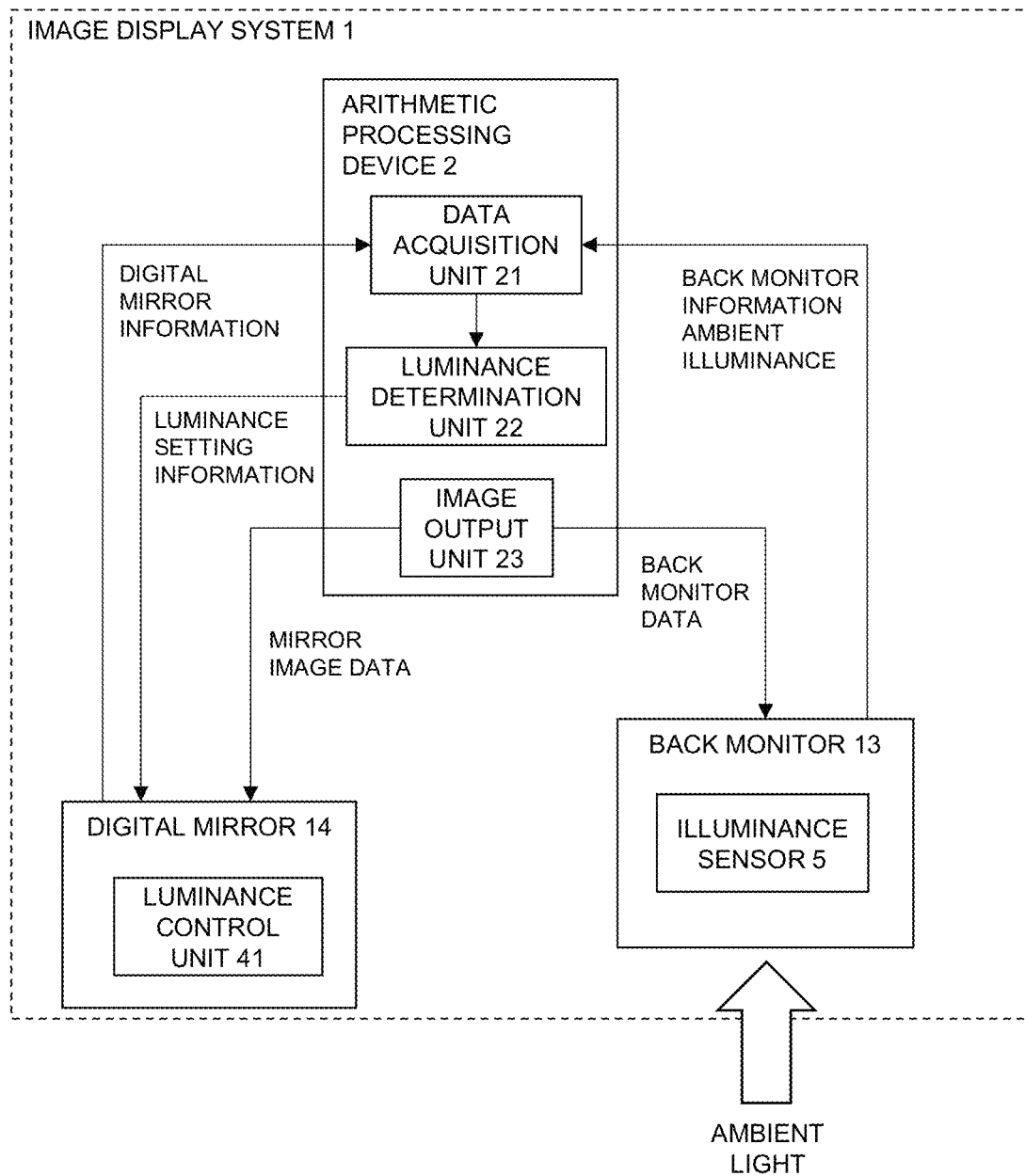

IMAGE DISPLAY SYSTEM FOR
DISPLAYING IMAGES IN DISPLAY AREAS,
METHOD FOR CAUSING COMPUTER TO
FUNCTION AS IMAGE DISPLAY SYSTEM
FOR DISPLAYING IMAGES IN DISPLAY
AREAS, AND NON-TRANSITORY
COMPUTER READABLE MEDIUM THAT
STORES PROGRAM FOR CAUSING
COMPUTER TO FUNCTION AS IMAGE
DISPLAY SYSTEM FOR DISPLAYING
IMAGES IN DISPLAY AREAS

TECHNICAL FIELD

The present invention relates to an image display system, image display method, and image display program.

BACKGROUND ART

Patent Literature 1 discloses an image display device that obtains the luminance of a display screen at which a viewer starts to feel dazzled, on the basis of illuminance near the display screen, information on the viewer, and the viewing distance.

CITATION LIST

Patent Literature

Patent Literature 1: Japanese Unexamined Patent Application Publication No. 2007-279405

SUMMARY OF INVENTION

Technical Problem

The inventors experimentally found that, when a user is using multiple display areas simultaneously and is viewing one display area, the optimal luminance of another display area varies with the luminance of the one display area.

The present invention has been made in view of the foregoing, and an object thereof is to, when a user is using multiple display areas and is viewing one display area, properly control the luminance of another display area on the basis of the luminance of the one display area.

Solution to Problem

The present invention provides an image display system for displaying images in display areas. The image display system includes a first display area, a second display area, and a luminance determination unit. The luminance determination unit is configured to determine luminance of the second display area on the basis of luminance of the first display area and positional relationships between the first display area, the second display area, and a user and to display the second display area at the determined luminance.

The image display system thus configured is able to control the luminance of the other display screen considering the luminance of the one display screen.

Various embodiments of the present invention are described below. Any of the embodiments described below can be combined with each other. The features thereof independently constitute the invention.

Preferably, the image display system further includes a data acquisition unit, and the luminance determination unit is configured to determine the luminance of the second display area further on the basis of illuminance acquired by the data acquisition unit.

Preferably, the luminance determination unit is configured to determine the luminance of the second display area on the basis of an index of light stimulation felt by the user.

Preferably, the index of the light stimulation is an index of glare felt by the user.

Preferably, the luminance determination unit is configured to determine the luminance of the second display area on the basis of at least one selected from a group consisting of a size of the second display area, a distance between the first display area and the second display area, a solid angle at which the user views the second display area, and a distance between the user and the first display area.

Preferably, the first display area is a monitor for displaying medical images.

Preferably, upper and lower limits of the luminance of the second display area are previously set.

Preferably, the first display area and the second display area are disposed in parallel in one monitor.

Preferably, the first display area and the second display area are disposed so as to overlap each other in one monitor.

Another aspect of the present invention provides a method for causing a computer to function as an image display system for displaying images in display areas. The method includes a data acquisition step and a luminance determination step. The data acquisition step includes the computer acquiring illuminance in an environment in which a first display area and a second display area included in the image display system are disposed. The luminance determination step includes the computer determining luminance of the second display area on the basis of the illuminance acquired in the data acquisition step, luminance of the first display area, and positional relationships between the first display area, the second display area, and a user and displaying the second display area at the determined luminance.

Yet another aspect of the present invention provides a program for causing a computer to function as an image display system for displaying images in display areas. The program causes the computer to perform a data acquisition step and a luminance determination step. The data acquisition step includes the computer acquiring illuminance in an environment in which a first display area and a second display area included in the image display system are disposed. The luminance determination step includes the computer determining luminance of the second display area on the basis of the illuminance acquired in the data acquisition step, luminance of the first display area, and positional relationships between the first display area, the second display area, and a user.

BRIEF DESCRIPTION OF DRAWINGS

FIG. 4 is a diagram showing the level of discomfort glare corresponding to a UGR value.

FIG. 6 is a block diagram showing the functional components of an image display system 1 according to a second embodiment.

DESCRIPTION OF EMBODIMENTS

1. First Embodiment (1.1. Hardware Components of Image Display System 1)

Figure 1:
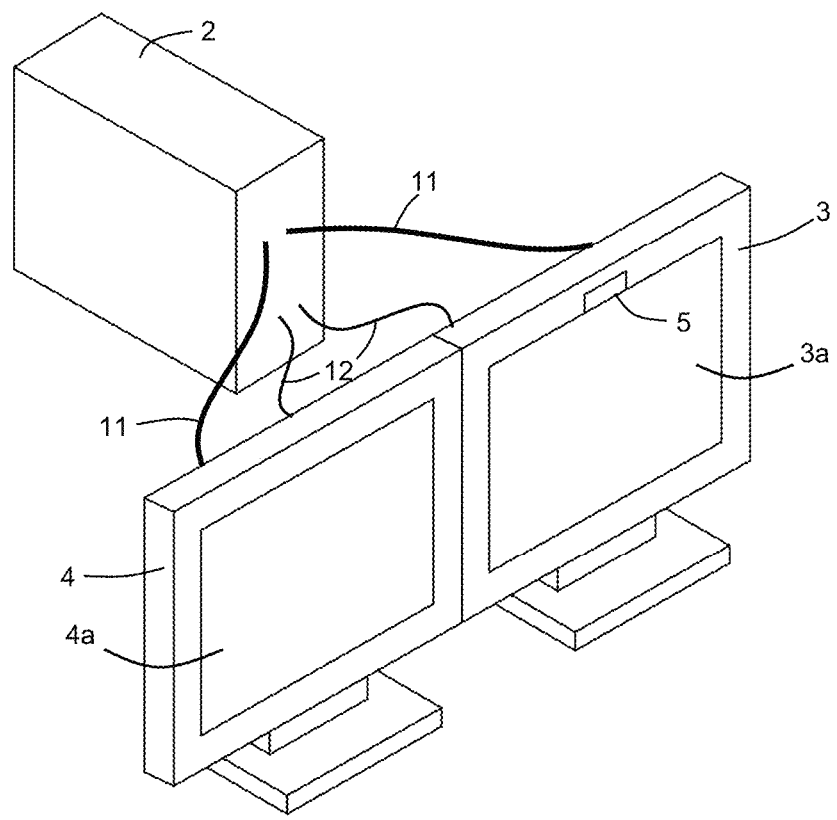
FIG. 1 is a diagram showing the hardware components of an image display system 1 according to a first embodiment.

Referring to FIG. 1, the hardware components of an image display system 1 will be described. As shown in FIG. 1, the image display system 1 includes an arithmetic processing device 2, an interpretation monitor 3 as a first display area, and a reference monitor 4 as a second display area. An illuminance sensor 5 is mounted on an upper portion of the front surface of the interpretation monitor 3. The image display system 1 is installed in, for example, an image interpretation room in a hospital. The interpretation monitor 3 displays medical images such as chest X-ray images and mammography images. The reference monitor 4 displays text and/or image data information, such as patients' medical records.

The arithmetic processing device 2 and the interpretation monitor 3 and reference monitor 4 are configured to be able to communicate with each other through video signal cables 11 and control signal cables 12. The arithmetic processing device 2 transmits image data to the interpretation monitor 3 and reference monitor 4 through the video signal cables 11.

Images based on the image data transmitted from the arithmetic processing device 2 are displayed on the display screen 3a of the interpretation monitor 3 and the display screen 4a of the reference monitor 4. The arithmetic processing device 2 and the interpretation monitor 3 and reference monitor 4 transmit and receive control signals and data to and from each other through the control signal cables 12.

(1.2. Functional Components of Image Display System 1)

Figure 2:
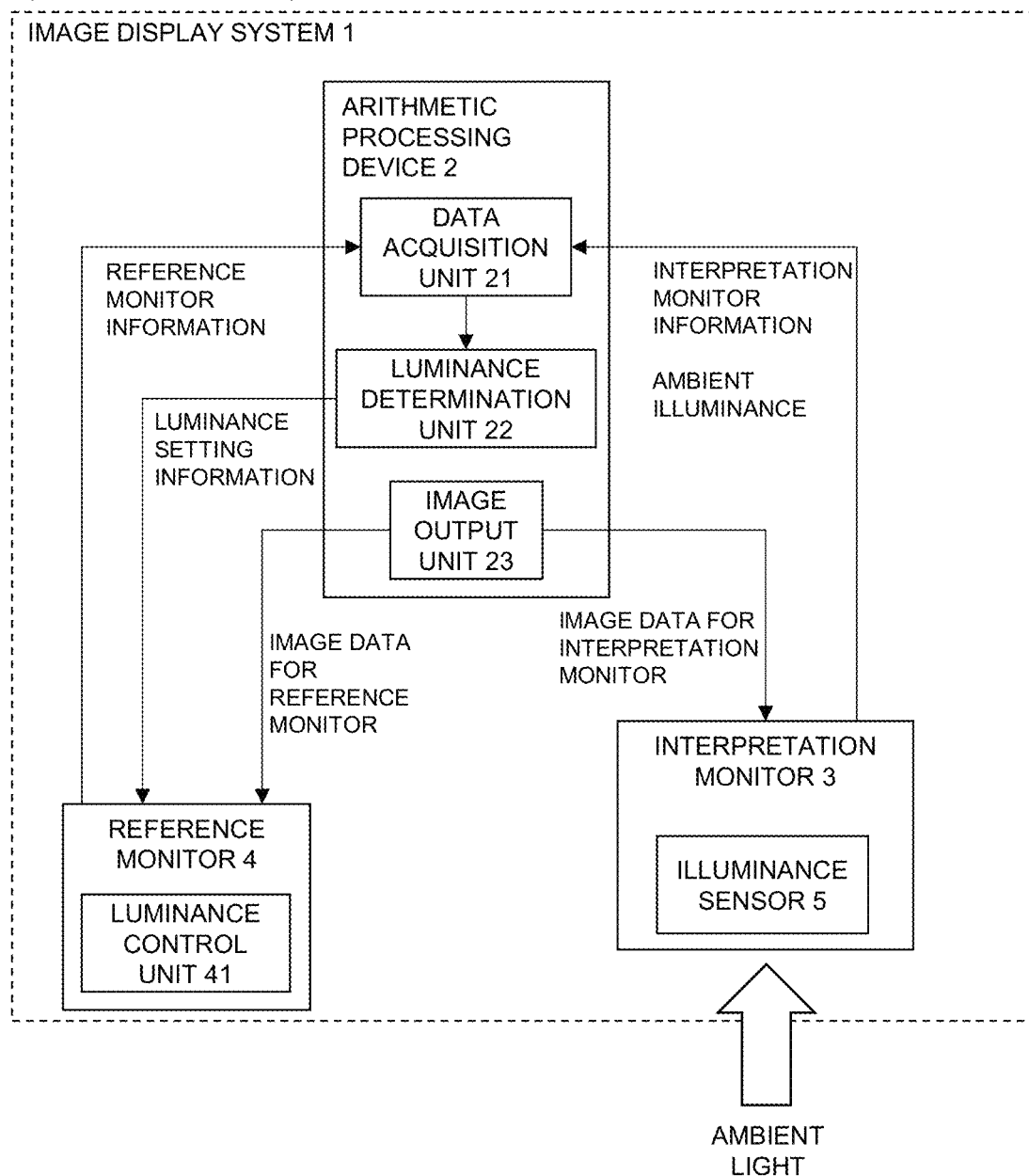
FIG. 2 is a block diagram showing the functional components of the image display system 1 according to the first embodiment.

Referring to FIG. 2, the functional components of the image display system 1 will be described. As described above, the image display system 1 includes the arithmetic processing device 2, interpretation monitor 3, reference monitor 4, and illuminance sensor 5. The arithmetic processing device 2 includes a data acquisition unit 21, a luminance determination unit 22, and an image output unit 23. The illuminance sensor 5 mounted on the interpretation monitor 3 detects illuminance in the environment (ambient illuminance), and the interpretation monitor 3 outputs the detected ambient illuminance to the arithmetic processing device 2.

The data acquisition unit 21 acquires the ambient illuminance detected by the illuminance sensor 5. The data acquisition unit 21 also acquires information on the interpretation monitor 3 and information on the reference monitor 4. Specifically, the data acquisition unit 21 acquires the luminance of the interpretation monitor 3, information on the sizes of the interpretation monitor 3 and reference monitor 4, and information on the positions of the interpretation monitor 3, the reference monitor 4, and a user. These pieces of information may be previously stored in a storage unit (memory, HDD, SSD, etc.) included in the arithmetic processing device 2 and acquired by the data acquisition unit 21 as necessary, or may be set by the user or manufacturer at the time of acquisition.

The luminance determination unit 22 determines the luminance of the reference monitor 4 on the basis of an index of light stimulation felt by the user. Details of the process performed by the luminance determination unit 22 will be described later. The luminance control unit 41 of the reference monitor 4 displays the display screen 4a at the luminance determined by the luminance determination unit 22.

The image output unit 23 outputs image data to be displayed on the interpretation monitor 3 and reference monitor 4. The image data may be, for example, color images including color components consisting of the three primary colors, red, green, and blue, or may be monochrome images such as X-ray images.

The interpretation monitor 3 is a monitor for displaying medical image data such as X-ray images. The interpretation monitor 3 consists of, for example, a liquid crystal display, an organic EL display, a touchscreen display, an electronic paper, or any other type of display.

The reference monitor 4 is a monitor for displaying text and/or image data information, such as patients' medical records. The reference monitor 4 consists of, for example, a liquid crystal display, an organic EL display, a touchscreen display, an electronic paper, or any other type of display.

The above components may be implemented by software or hardware. In the case of software, the functions are implemented by execution of a program by the CPU. The program may be stored in the storage unit included in the arithmetic processing device 2 or a computer-readable, non-transitory storage medium.

The program stored in an external storage unit may be read and executed by so-called "cloud computing." In the case of hardware, the components may be implemented by various types of circuits, such as ASIC, FPGA, and DRP.

(1.3. Process by Luminance Determination Unit 22)

Figure 3:
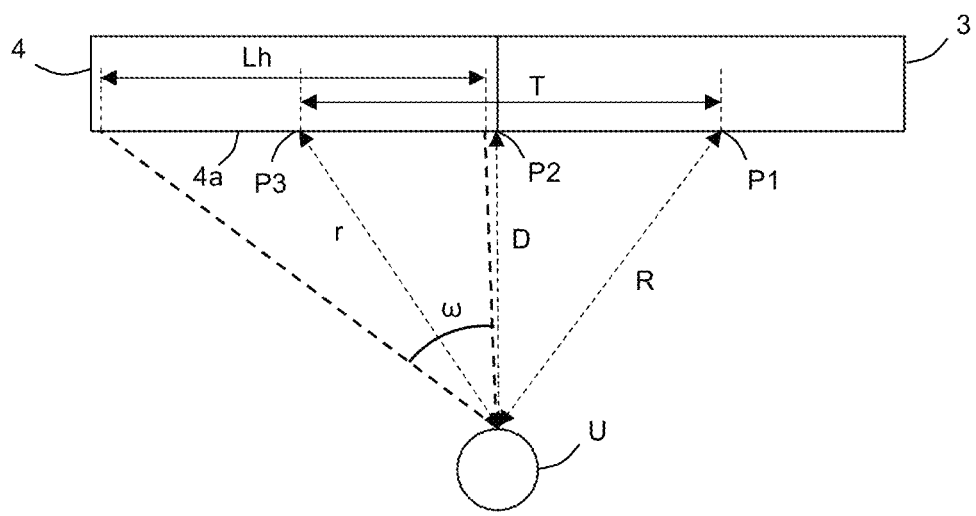
FIG. 3 is a diagram showing the positional relationships between a user, an interpretation monitor 3, and a reference monitor 4.

Referring to FIG. 3, the process performed by the luminance determination unit 22 will be described. Note that the process performed by the luminance determination unit 22 described below is only illustrative and details of the process are not limiting.

As described above, the luminance determination unit 22 controls the luminance of the reference monitor 4 on the basis of the index of light stimulation from a high-luminance luminous body (hereafter also simply referred to as a luminous body) in the range of vision felt by a user U. In the present embodiment, it is assumed that the reference monitor 4 is a high-luminance luminous body.

In the present embodiment, discomfort glare, which is an index of glare felt by the user U, is calculated as the index of light stimulation. As used herein, the term "discomfort glare" refers to a state in which a user has difficulty in viewing a target to be viewed or feels uncomfortable due to the presence of a high-luminance luminous body in the range of vision. Various calculation formulas for quantitatively calculating discomfort glare are already known. As an example, in the present embodiment, discomfort glare is calculated on the basis of the UGR index (hereafter also referred to as the UGR value). The UGR index is defined by Formula (1) below.

[Formula 1]

$$UGR = 8\log\left(\frac{0.25}{L_b} \times \sum \frac{L_t^2 \omega}{P^2}\right) \quad (1)$$

$$UGR = 8\log\left(\frac{0.25}{L_b} \times \sum \frac{L_t^2 \omega}{P^2}\right) \quad (1)$$

In Formula (1), Lb represents the background luminance, ω represents a solid angle, P represents a position index, and Lt represents the light-emitting luminance. These will be described in turn below.

The background luminance Lb represents uniform luminance in a space around the user U except for the luminous body causing discomfort glare in the range of vision. In the present embodiment, the background luminance Lb is calculated by Formulas (2) and (3) below considering the influence of the interpretation monitor 3.

[Formula 2]

$$L_b = L_d + L_{amb} \quad (2)$$

$$L_b = L_d + L_{amb} \quad (2)$$

[Formula 3]

$$L_{amb} = I_{amb} \times kc \quad (3)$$

$$L_{amb} = I_{amb} \times kc \quad (3)$$

In Formulas (2) and (3), Ld represents the set luminance of the interpretation monitor 3 and Lamb represents the ambient luminance. Iamb represents the ambient illuminance detected by the illuminance sensor 5 and kc represents a luminance conversion coefficient.

The solid angle ω is defined by the area of the display screen 4a, which is a luminous body, and the distance from the user U to the luminous body. In the present embodiment, the solid angle ω is calculated by Formula (4) below.

[Formula 4]

$$\omega = \frac{A_p}{r^2} = \frac{L_h L_v}{\sqrt{D^2 + \left(\frac{L_h}{2}\right)^2}} \quad (4)$$

$$\omega = \frac{A_p}{r^2} = \frac{L_h L_v}{\sqrt{D^2 + \left(\frac{L_h}{2}\right)^2}} \quad (4)$$

In Formula (4), Ap represents the display area of the display screen 4a of the reference monitor 4 and r represents the length from the user U to the center point P3 of the reference monitor 4. Lh represents the horizontal length of the display screen 4a, Lv represents the vertical length of the display screen 4a, and D represents the vertical distance from the user U to the reference monitor 4 (that is, the length from the user U to a foot P2 of a perpendicular to the reference monitor 4).

The position index P is a coefficient defined by the positional relationships between the user U, the luminous body, and the point of attention of the user U. In the present embodiment, the position index P is calculated by Formula (5) below.

[Formula 5]

$$P = 1.2997\frac{T}{R} + 0.8464 = 1.2997\frac{L_h}{\sqrt{D^2 + \left(\frac{L_h}{2}\right)^2}} + 0.8464 \quad (5)$$

$$P = 1.2997\frac{T}{R} + 0.8464 = 1.2997\frac{L_h}{\sqrt{D^2 + \left(\frac{L_h}{2}\right)^2}} + 0.8464 \quad (5)$$

In Formula (5), T represents the length from the center point P1 of the interpretation monitor 3 to the center point P3 of the reference monitor 4. R represents the length from the center point P1 of the interpretation monitor 3 to the user U. Here, it is assumed that the center point P1 is the point of attention of the user U. The point of attention of the user U can be changed as necessary. For example, when the user U is paying attention to the left half of the interpretation monitor 3, the center point of the left half of the screen may be set to P1. Note that when the interpretation monitor 3 and reference monitor 4 are vertically away from each other, the position index may be set considering the vertical length.

The light-emitting luminance Lt represents the light-emitting luminance of the luminous body in the range of vision. That is, in the present embodiment, the light-emitting luminance Lt corresponds to the light-emitting luminance of the reference monitor 4. The light-emitting luminance Lt is obtained as Formula (6) below on the basis of Formula (1).

[Formula 6]

$$L_t^2 = \sqrt{10^{\frac{UGR}{8}} \frac{L_b}{0.25} \frac{P^2}{\omega}} \quad (6)$$

$$L_t^2 = \sqrt{10^{\frac{UGR}{8}} \frac{L_b}{0.25} \frac{P^2}{\omega}} \quad (6)$$

By calculating the background luminance Lb, solid angle ω, and position index P and previously setting the target UGR value as described in the formula, the light-emitting luminance Lt of the reference monitor 4 for realizing the target UGR value is obtained.

As shown in FIG. 4, how the viewer feels with respect to the respective UGR values are previously defined. The luminance determination unit 22 controls the light-emitting luminance Lt of the reference monitor 4 so that the previously set target UGR value is realized.

For example, in the case of a liquid crystal display, the light-emitting luminance Lt may be controlled by controlling the luminance of the backlight. In the case of an organic EL display, the light-emitting luminance Lt may be controlled by controlling the current value of the LED. The light-emitting luminance Lt may be controlled by controlling the gain of the monitor, or the video signal. The light-emitting luminance Lt may be controlled by a combination of these.

(1.4. Example)

Figure 5A:
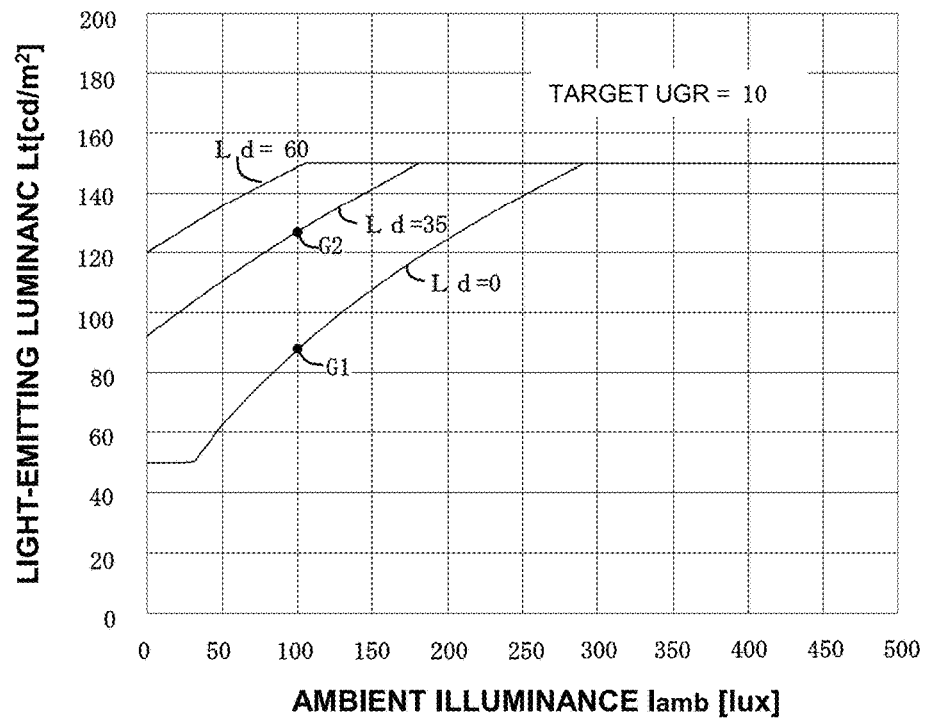
FIG. 5A is a graph showing the light-emitting luminance Lt of the reference monitor 4 when the target UGR value is set to 6.

FIG. 5A is a graph showing the relationships between the set luminance Ld of the interpretation monitor 3, the ambient illuminance Iamb, and the light-emitting luminance Lt when the target UGR value is set to 10. From FIG. 5A, it can be read that the value of the light-emitting luminance Lt of the reference monitor 4 varies with the ambient illuminance Iamb and the set luminance Ld of the interpretation monitor 3 when the target UGR value is set to 10. Here, the lower limit and upper limit of the light-emitting luminance Lt of the reference monitor 4 are previously set to 50 (cd/m$^2$) and 150 (cd/m$^2$), respectively. By setting the upper limit and lower limit of the light-emitting luminance Lt of the reference monitor 4 as described above, abrupt variations in the light-emitting luminance Lt can be suppressed.

Figure 5B:
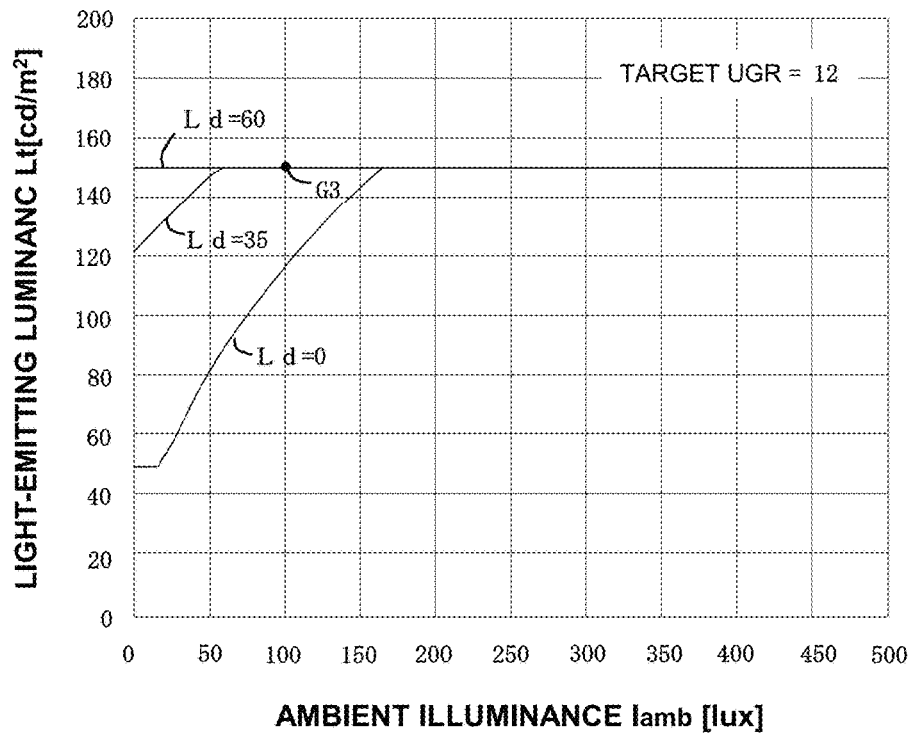
FIG. 5B is a graph showing the light-emitting luminance Lt of the reference monitor 4 when the target UGR value is set to 9.

FIG. 5B is a graph corresponding to FIG. 5A when the target UGR value is set to 12. FIG. 5B will be examined below in comparison with FIG. 5A. First, as an example, a case in which the target UGR value is 10 and the ambient illuminance Iamb is 100 (lux) will be examined.

When the set luminance Ld of the interpretation monitor is 35 (cd/m$^2$), the light-emitting luminance Lt of the reference monitor 4 is about 125 (cd/m$^2$), as shown by a point G2 in FIG. 5A. Also, when the set luminance Ld of the interpretation monitor is 0 (cd/m$^2$), the light-emitting luminance Lt of the reference monitor 4 is about 90 (cd/m$^2$), as shown by a point G1 in FIG. 5A.

As seen above, when the ambient illuminance and target UGR value are constant, the light-emitting luminance Lt of the reference monitor 4 is controlled so as to be increased as the set luminance Ld of the interpretation monitor 3 is increased.

Next, as another example, a case in which the ambient illuminance Iamb is 100 (lux) and the set luminance Ld of the interpretation monitor is 35 (cd/m$^2$) will be examined.

When the target UGR value is 10, the light-emitting luminance Lt of the reference monitor 4 is about 125 (cd/m2), as shown by a point G2 in FIG. 5A. On the other hand, when the target UGR value is 12, the light-emitting luminance Lt of the reference monitor 4 is the upper limit value 150 (cd/m$^2$), as shown by a point G3 in FIG. 5B.

As seen above, when the ambient illuminance Iamb and the set luminance Ld of the interpretation monitor are constant, the light-emitting luminance Lt is controlled so as to be increased as the target UGR value is increased.

As seen above, the luminance determination unit 22 according to the present embodiment controls the luminance of the reference monitor 4 on the basis of the ambient illuminance acquired by the illuminance sensor 5 and the positional relationships between the interpretation monitor 3, reference monitor 4, and user U. Thus, the luminance of one display screen can be controlled considering the luminance of another display screen.

Rooms for interpreting X-ray images or the like, such as one in which the image display system 1 according to the present embodiment is installed, are dark. For this reason, users are more likely to feel glare and enjoy the advantageous effects of the present application. That is, since glare from reference images such as patients' medical records, which have low priority, can be reduced, users can concentrate on medical images, which have high priority. When a medical image that a user is paying attention to is dark and an image that the user is not paying attention to is bright, the contrast is high and the user is more likely to feel glare. By using the invention of the present application, the glare can be reduced.

2. Second Embodiment

Referring to FIG. 6, a second embodiment of the invention of the present application will be described focusing on the difference from the above embodiment. The second embodiment differs from the first embodiment in that an image display system 1 is mounted on a car.

Specifically, in the second embodiment, a back monitor 13 corresponds to a first display area, and a digital mirror 14 corresponds to a second display area. An image output unit 23 outputs back image data to the back monitor 13 and outputs mirror image data to the digital mirror 14. The back monitor 13 is a monitor for displaying images of the rear captured by a camera when a car is backed up and is typically installed in the center in front of the driver's seat. The digital mirror 14 is a monitor for displaying images from a camera for checking the rear when the car is driven and are typically installed in the center of an upper portion of the front glass (in the position of the rear-view mirror), or on both sides of the car (in the positions of the side-view mirrors).

In the present embodiment, a luminance determination unit 22 controls the luminance of the digital mirror 14 mainly when the car is backed up. A driver pays attention to the back monitor 13 when backing up the car. For this reason, when the digital mirror 14 emits strong light, the driver has difficulty in viewing the back monitor 13. In this case, the luminance determination unit 22 controls the luminance of the digital mirror 14 on the basis of the ambient illuminance acquired by an illuminance sensor 5, the luminance of the back monitor, and the relationships between the back monitor 13, digital mirror 14, and driver.

3. Other Embodiments

The application of the present invention is not limited to the above embodiments. For example, while the UGR index is used as the index of discomfort glare, the UGR index is not limiting.

Specifically, any other index such as DGI, GI, BGI, or CGI may be used. Also, instead of the index of light stimulation or the index of glare, an experimentally determined index may be used. For example, the luminance of the second display area may be determined on the basis of statistical data on race, age, or the like.

While, in the first embodiment, the image display system 1 includes the interpretation monitor 3 as the first display area and the reference monitor 4 as the second display area, this configuration is not limiting. For example, the image display system may include multiple first display areas and multiple second display areas.

The image display system 1 may be implemented in the so-called "picture-by-picture (PbyP)" form, in which a first display area and a second display area are arranged in parallel in one monitor. The image display system 1 may also be implemented in the so-called "picture-in-picture (PinP)" form, in which one of a first display area and a second display area is included in the other area.

While, in the first embodiment, the illuminance sensor 5 is mounted on the interpretation monitor 3, this configuration is not limiting. For example, the illuminance sensor 5 may be mounted on the reference monitor 4. The illuminance sensor 5 may also be installed outside the illuminance sensor 5 and the interpretation monitor 3. Also, ambient illuminance set by the user or manufacturer may be used without using the illuminance sensor.

The luminance of the second display area may be determined without using the ambient illuminance. In this case, only the background luminance Lb is a variable in Formula (2), and the other items such as a constant may be determined as appropriate. Thus, glare of the second display area can be reduced even in an environment in which no illuminance sensor is present.

In the first embodiment, the set luminance used as the luminance of the interpretation monitor 3 may be, for example, a set brightness value (for example, in the case of a liquid crystal display, the ratio with respect to the backlight output value or the maximum backlight output value) or the luminance value. Also, the luminance of the interpretation monitor 3 may be determined on the basis of information on the application. Specifically, the luminance of the interpretation monitor 3 may be determined in accordance with the application such as mammography or ultrasound, and/or image data. For example, the luminance of the interpretation monitor 3 may be determined in accordance with a luminance value corresponding to the application, the value of a part or center of the screen of image data, the mode, median, or average of a histogram calculated from the image data, or the like. The luminance of the interpretation monitor 3 may also be determined on the basis of information on the model of the monitor.

While, in the first embodiment, the set luminance is used as the luminance of the interpretation monitor 3, this configuration is not limiting. For example, the luminance of the interpretation monitor 3 may be determined on the basis of image data and the relationship between the image data and the luminance, or may be determined by measuring the luminance of the display screen or backlight using a luminance sensor.

In the first embodiment, the distances between the user U and the interpretation monitor 3 and reference monitor 4 may be previously set values, values inputted by the user or manufacturer, or values acquired by a distance sensor.

While, in the second embodiment, the back monitor 13 corresponds to the first display area and the digital mirror 14 corresponds to the second display area, this configuration is not limiting. For example, a head-up display displayed on the front glass may be used as the first display area, and a digital mirror may be used as the second display area.

Or, instead of the head-up display, an in-car TV, an in-car DVD, or a monitor for displaying Internet information or the like may be used as the first display area. Instead of the digital mirror, the monitor of a car navigation system or an instrument panel (an instrument display panel such as a speedometer) may be used as the second display area.

The present invention may be embodied as a program for causing a computer to function as the above image display system.

The present invention may be embodied as a computer-readable, non-transitory storage medium storing the above program.

While the various embodiments according to the present invention have been described, the embodiments are only illustrative and are not intended to limit the scope of the invention. This novel embodiment can be carried out in other various forms, and various omissions, replacements, or changes can be made thereto without departing from the spirit of the invention. The embodiments and modifications thereof are included in the spirit and scope of the present invention, as well as included in the scope of the invention set forth in the claims and equivalents thereof.

REFERENCE SIGNS LIST

1: image display system
2: arithmetic processing device
3: interpretation monitor
3*a*: display screen
4: reference monitor
4*a*: display screen
5: illuminance sensor
11: video signal cable
12: control signal cable
13: back monitor
14: digital mirror
21: data acquisition unit
22: luminance determination unit
23: image output unit
41: luminance control unit

The invention claimed is:

1. An image display system for displaying images in display areas, comprising:
   a first display area;
   a second display area; and
   a luminance determination unit, wherein
   the luminance determination unit comprising a processor, a circuit, or a combination thereof, wherein
   the luminance determination unit is configured to determine luminance of the second display area on the basis of luminance of the first display area and positional relationships between the first display area, the second display area, and a user so that an index value of light stimulation felt by the user from the second display area when the user is viewing the first display area, realizes a previously set index value, and to display the second display area at the determined luminance.

2. The image display system of claim 1, further comprising a data acquisition unit comprising a processor, a circuit, or a combination thereof, wherein
   the luminance determination unit is configured to determine the luminance of the second display area further on the basis of illuminance acquired by the data acquisition unit.

3. The image display system of claim 1, wherein the index of the light stimulation is an index of glare felt by the user.

4. The image display system of claim 1, wherein the luminance determination unit is configured to determine the luminance of the second display area on the basis of at least one selected from a group consisting of a size of the second display area, a distance between the first display area and the second display area, a solid angle at which the user views the second display area, and a distance between the user and the first display area.

5. The image display system of claim 1, wherein the first display area is a monitor for displaying medical images.

6. The image display system of claim 1, wherein upper and lower limits of the luminance of the second display area are previously set.

7. The image display system of claim 1, wherein the first display area and the second display area are disposed in parallel in one monitor.

8. The image display system of claim 1, wherein the first display area and the second display area are disposed so as to overlap each other in one monitor.

9. A method for causing a computer to function as an image display system for displaying images in display areas, the method comprising:
   a luminance determination step,
   wherein the luminance determination step comprises the computer determining luminance of the second display area on the basis of luminance of the first display area, and positional relationships between the first display area, the second display area, and a user so that an index value of light stimulation felt by the user from the second display area when the user is viewing the first display area, realizes a previously set index value, and displaying the second display area at the determined luminance.

10. A non-transitory computer readable medium that stores a program for causing a computer to function as an image display system for displaying images in display areas, the program causing the computer to perform:
a luminance determination step,
wherein the luminance determination step comprises the computer determining luminance of the second display area on the basis of the luminance of the first display area, and positional relationships between the first display area, the second display area, and a user so that an index value of light stimulation felt by the user from the second display area when the user is viewing the first display area, realizes a previously set index value.

* * * * *